US009475517B2

(12) United States Patent
Driessen (10) Patent No.: US 9,475,517 B2
(45) Date of Patent: Oct. 25, 2016

(54) SEAT AND PUSHCHAIR OR BUGGY PROVIDED WITH SUCH A SEAT

(71) Applicant: MUTSY B.V., Goirle (NL)

(72) Inventor: Franciscus Johannes Cornelius Driessen, Goirle (NL)

(73) Assignee: Mutsy B.V. (NL)

( * ) Notice: Subject to any disclaimer, the term of this patent is extended or adjusted under 35 U.S.C. 154(b) by 0 days.

(21) Appl. No.: 14/428,166

(22) PCT Filed: Sep. 13, 2013

(86) PCT No.: PCT/NL2013/050662
§ 371 (c)(1),
(2) Date: Mar. 13, 2015

(87) PCT Pub. No.: WO2014/042533
PCT Pub. Date: Mar. 20, 2014

(65) Prior Publication Data
US 2015/0259005 A1    Sep. 17, 2015

(30) Foreign Application Priority Data
Sep. 13, 2012 (NL) .................................... 2009461

(51) Int. Cl.
| B60N 2/02 | (2006.01) |
| B60N 2/20 | (2006.01) |
| B60N 2/24 | (2006.01) |
| B60N 2/32 | (2006.01) |
| B62B 9/12 | (2006.01) |
| B62B 9/10 | (2006.01) |

(52) U.S. Cl.
CPC ........ *B62B 9/12* (2013.01); *B62B 9/104* (2013.01)

(58) Field of Classification Search
CPC ................................. B62B 9/12; B62B 9/104

USPC ........................ 297/118, 130, 354.12, 440.22
See application file for complete search history.

(56) References Cited

U.S. PATENT DOCUMENTS

| 4,786,064 | A | * | 11/1988 | Baghdasarian | ........... B62B 7/12 |
| | | | | | 297/130 X |
| 5,201,535 | A | * | 4/1993 | Kato | ....................... B62B 7/123 |
| | | | | | 297/130 X |
| 5,338,096 | A | * | 8/1994 | Huang | .................... B62B 7/142 |
| | | | | | 297/440.22 X |
| 5,472,224 | A | | 12/1995 | Cabagnero | |
| 6,045,145 | A | * | 4/2000 | Lan | ........................... B62B 9/28 |
| | | | | | 280/47.35 |
| 6,089,653 | A | * | 7/2000 | Hotaling | ................ A47D 1/002 |
| | | | | | 297/130 |

(Continued)

FOREIGN PATENT DOCUMENTS

| GB | 2480013 A | 11/2011 |
| JP | H09193810 A | 7/1997 |
| JP | 2001097226 A | 4/2001 |

OTHER PUBLICATIONS

International Search Report and Written Opinion mailed Jan. 2, 2014 (PCT/NL2013/050662); ISA/EP.

*Primary Examiner* — Rodney B White
(74) *Attorney, Agent, or Firm* — Banner & Witcoff, Ltd.

(57) ABSTRACT

The present invention relates to a seat. The present invention also relates to a pushchair or buggy provided with such a seat. With a four-bar linkage comprising a back part, a seat part, an attaching unit and a first arm a seat is obtained wherein the center of gravity does not displace, or hardly so, during pivoting from a sitting position to a recumbent position. It hereby becomes possible for the undercarriage of a pushchair or buggy to take a smaller form.

21 Claims, 13 Drawing Sheets

(56) References Cited

U.S. PATENT DOCUMENTS

| | | | | |
|---|---|---|---|---|
| 6,318,807 B1 * | 11/2001 | Perego | B62B 7/142 | 297/130 |
| 6,793,280 B2 * | 9/2004 | Washizuka | B60N 2/2806 | 297/130 |
| 6,942,294 B2 * | 9/2005 | Takamizu | B60N 2/2848 | 297/250.1 |
| 7,017,921 B2 * | 3/2006 | Eros | B62B 9/28 | 280/47.38 |
| 7,032,922 B1 * | 4/2006 | Lan | B62B 7/08 | 280/643 |
| 7,267,359 B1 * | 9/2007 | Yang | B62B 7/08 | 280/47.34 |
| 7,370,913 B2 * | 5/2008 | Takamizu | B60N 2/2848 | 297/256.16 |
| 7,377,537 B2 * | 5/2008 | Li | B62B 7/123 | 280/47.38 |
| 7,681,894 B2 * | 3/2010 | Santamaria | B62B 7/142 | 24/589.1 |
| 7,686,323 B2 * | 3/2010 | Chen | B62B 7/142 | 280/47.38 |
| 7,798,500 B2 * | 9/2010 | Den Boer | B62B 7/062 | 280/47.34 |
| 8,371,606 B2 * | 2/2013 | Gower | B62B 7/008 | 280/47.38 |
| 8,585,075 B2 * | 11/2013 | Zhong | B60N 2/2845 | 280/47.38 |
| 8,651,502 B2 * | 2/2014 | Winterhalter | B60N 2/2848 | 280/47.4 |
| 8,764,048 B1 * | 7/2014 | Ahnert | B62B 9/104 | 280/47.4 |
| 8,967,171 B2 * | 3/2015 | Horst | B62B 5/0013 | 135/88.02 |
| 9,010,773 B2 * | 4/2015 | Horst | B62B 7/008 | 280/47.38 |
| 9,085,312 B2 * | 7/2015 | Liu | B62B 7/08 | |
| 2001/0013689 A1 * | 8/2001 | Cone, II | B62B 9/28 | 280/47.41 |
| 2008/0150247 A1 * | 6/2008 | Lake | B62B 7/123 | 280/47.41 |
| 2010/0127480 A1 * | 5/2010 | Ahnert | B62B 7/08 | 280/647 |
| 2010/0230933 A1 * | 9/2010 | Dean | B60N 2/2821 | 280/647 |
| 2010/0244408 A1 * | 9/2010 | Dean | B62B 7/08 | 280/647 |
| 2011/0266762 A1 | 11/2011 | Chen | | |
| 2013/0154241 A1 * | 6/2013 | Parkinson | B62B 7/008 | 280/650 |
| 2013/0207369 A1 * | 8/2013 | Pollack | B62B 9/12 | 280/650 |
| 2014/0062146 A1 * | 3/2014 | Haut | B62B 9/20 | 297/183.1 |
| 2015/0042075 A1 * | 2/2015 | Smith | B62B 7/062 | 280/650 |
| 2015/0076795 A1 * | 3/2015 | Liu | B62B 7/08 | 280/642 |

* cited by examiner

SEAT AND PUSHCHAIR OR BUGGY PROVIDED WITH SUCH A SEAT

This application is a U.S. National Phase Entry of International Application No. PCT/NL2013/050662 filed on Sep. 13, 2013, designating the United States of America and claiming priority to NL Patent Application No. 2009461 filed on Sep. 13, 2012. The present application claims priority to and the benefit of the above-identified applications, and the above-identified applications are incorporated by reference herein in their entirety.

The present invention relates to a seat. The present invention also relates to a pushchair or buggy provided with such a seat.

Known from the prior art are a pushchair and a buggy, wherein the seat can be pivoted between a sitting position and a recumbent position. Such a seat is mounted on an undercarriage of the pushchair or buggy.

A drawback of the known seat is that the pivotability of the seat imposes requirements on the undercarriage in respect of the stability of the pushchair. It must after all be possible to transport the child safely, irrespective of the position of the seat, without the danger of the pushchair or buggy tipping over.

There is an ever increasing need to give the pushchair or buggy the smallest possible form. This is partially related to wanting to be able to transport the pushchair or buggy in for instance a car, albeit in collapsed position. The problem occurs here that reducing the size of the pushchair or buggy does not improve, and even worsens, the stability of the pushchair or buggy.

A second drawback of the known seat is that it is difficult to collapse the undercarriage together with mounted seat to form a compact package This is extra difficult when the seat consists of hard parts.

A further drawback of the known seat is the compactness of the collapsed whole. The collapsed seat often protrudes here, thereby increasing the total amount of space taken up.

The present invention has for its object to provide a solution for at least one of the above stated problems.

This object is achieved by means of a seat as defined in claim 1.

The seat according to the invention is evidently intended for placing on an undercarriage of a pushchair or buggy and comprises a seat part and a back part coupled pivotally to the seat part. The seat part and the back part here together form a support surface suitable for supporting a child in a recumbent position and sitting position. The seat further comprises an attaching unit coupled pivotally to the back part, which attaching unit is connectable to the undercarriage. The back part and the seat part can pivot relative to each other between the sitting position and recumbent position.

According to the invention the seat further comprises a first arm which is connected pivotally to the attaching unit and pivotally to the seat part.

The seat according to the invention can however be used on a different undercarriage, for instance the undercarriage or lower part of a child seat or a child rocker. The invention is therefore not limited to the application in a pushchair or buggy.

The seat according to the invention comprises a four-bar linkage. One arm is formed here by the attaching unit, one arm by the back part, one arm by the seat part and one arm by the first arm.

The attaching unit preferably has a fixed orientation relative to the undercarriage on which the seat is placed.

Because the seat comprises a four-bar linkage, during the pivoting movement from the sitting position to the recumbent position the downward movement of the back part will be linked to a horizontal displacement of the seat part. A displacement in the center of gravity of the combination of seat and child resulting from the child lying down can hereby be compensated. In other words, the center of gravity relative to the undercarriage will not change, or hardly so, in the horizontal direction, i.e. the direction of travel or direction of forward movement. The distance between the front wheel and the rear wheel can hereby be reduced compared to the prior art because less variation in the position of the center of gravity of the combination of seat and child has to be absorbed. It is also possible to opt to maintain an equal distance between the front wheels and rear wheels. Because the center of gravity varies less, the seat can however have a greater range of backrest adjustment without the rearward stability being compromised. The pushchair can further stand on a steeper incline before it tips over backwards. According to the invention it is thus possible to realize a seat with a comfortable recumbent position.

The center of gravity, at least the horizontal component thereof, therefore preferably has to fall between the front wheel and rear wheel in both the recumbent position and the sitting position. If this center of gravity does not vary, or hardly so, the rear wheel and the front wheel can be placed closer together without the pushchair or buggy becoming unstable. The pushchair or buggy can therefore take a smaller form when compared to the prior art.

The back part and the seat part are preferably connected pivotally at a first pivot point, this point moving toward the attaching unit, and preferably to an end thereof remote from the child, during pivoting from the sitting position to the recumbent position. Here the movement of the first pivot point during pivoting from the sitting position to the recumbent position preferably substantially compensates a difference in position of a center of gravity of the child between a sitting position and a recumbent position, such that the center of gravity of a combination of seat and child does not change, or hardly so, during said pivoting. The movement of the first pivot point in a forward direction covers for instance between 0 and 40 percent of a length of the seat part, and more particularly between 10 and 30 percent of the length of the seat part.

The attaching unit and the first arm are preferably placed on the sides of the back part and the seat part forming the support surface. In an embodiment the first arm extends substantially vertically, at least in the sitting position, and an outer end thereof is connected to the back part by the attaching unit. The seat part will also extend substantially in the horizontal plane.

The seat according to the invention preferably comprises an attaching unit and a first arm as defined above on either side of the seat.

The pivoting of the back part and the seat part can preferably be locked by locking means. These comprise for instance a first engaging structure placed on or in the back part and a second engaging structure placed on or in the attaching unit. The first and second engaging structures are preferably movable between a locking position, in which the engaging structures engage each other and relative rotation of the back part and the attaching unit is locked, and a release position in which the engaging structures do not engage each other, or hardly so, whereby the back part and the attaching unit are pivotable relative to each other. It is not precluded that such engaging structures are provided in addition or instead in the back part and the seat part. For the purpose of locking the seat it is sufficient to fix two of the four bars of the four-bar linkage relative to each other. This need not necessarily take place at a pivot point.

The seat can also be provided with a protective bracket coupled to the first arm. Such a bar runs in transverse direction over the seat and provides protection for the child. The protective bracket can also be used by the child as support for the arms or can serve as mounting arm for toys.

It is recommended that the protective bracket has a fixed orientation relative to the first arm in the recumbent position and sitting position. This achieves that the protective bracket co-displaces during pivoting of seat part and back part. The position of the protective bracket here in the sitting position is preferably over the upper legs of a child and in the recumbent position over the waist of the child. This provides a more ergonomic system than a system wherein the position of the protective bracket is fixed. During pivoting from the sitting position to the recumbent position the protective bracket moreover co-displaces with the first arm in the invention. The user need hereby not move the protective bracket separately.

It is desirable for the user that the pushchair or buggy is collapsible. If the seat remains coupled to the undercarriage of the pushchair or buggy, this likewise has to be collapsible. It is therefore recommended that the seat is collapsible by pivoting the seat part and the back part toward each other. This is particularly important in embodiments wherein the seat part and the back part are manufactured at least partially, and preferably for more than 75 percent by volume, from rigid materials such as plastic or metal.

In order to prevent the problem of the protective bracket of the collapsed seat becoming jammed during collapsing of the undercarriage of a pushchair or buggy, the protective bracket is preferably coupled pivotally to the first arm and the seat further comprises second locking means for mutual locking of the protective bracket and the first arm. These second locking means are preferably configured to release the protective bracket when there is sufficient relative rotation of the seat part and the back part such that it can pivot relative to the first arm.

The attaching unit is used to couple the seat to the undercarriage. In an embodiment this unit comprises a second arm which is coupled pivotally to the back part and to the first arm. The attaching unit preferably further comprises a coupling part with coupling means for coupling of the coupling part, and therefore also the seat as a whole, to the undercarriage, as well as locking means for coupling and fixing the coupling part and the second arm in relative position, and for releasing the relative position. The coupling part is connectable to the second arm here in preferably at least two different angular positions. The coupling part can for instance be connectable to the second arm at two different angular positions at right angles to each other, for instance by means of rotation about a common axis. These right-angled positions enable the seat to be placed facing forward and backward. A parent can thus opt to have the child face forward or backward.

It is recommended that the relative position and form of the four bars of the four-bar linkage are configured such that, when the seat is collapsed, the back part and the seat part come to lie substantially parallel to the second arm of the attaching unit. An exceptionally compact form of the collapsed pushchair can hereby be obtained.

The relative position and form of the four bars of the four-bar linkage can in addition or instead be configured such that, when the seat is collapsed, the pivot point between the back part and the seat part displaces substantially to the rear relative to the attaching unit.

According to a second aspect, the present invention provides a pushchair or buggy comprising an undercarriage and a seat coupled thereto, wherein the seat is configured as described above.

In an embodiment the undercarriage is provided with a front wheel and a rear wheel, and the seat is coupled to the undercarriage such that, when a child is present in the seat, the center of gravity of the combination of the seat and the child lies between the rear wheel and front wheel in both the sitting position and the recumbent position. At least one front wheel or rear wheel can take a swivelling form here.

The invention will be elucidated in more detail hereinbelow with reference to the accompanying figures, wherein.

Figure 1:
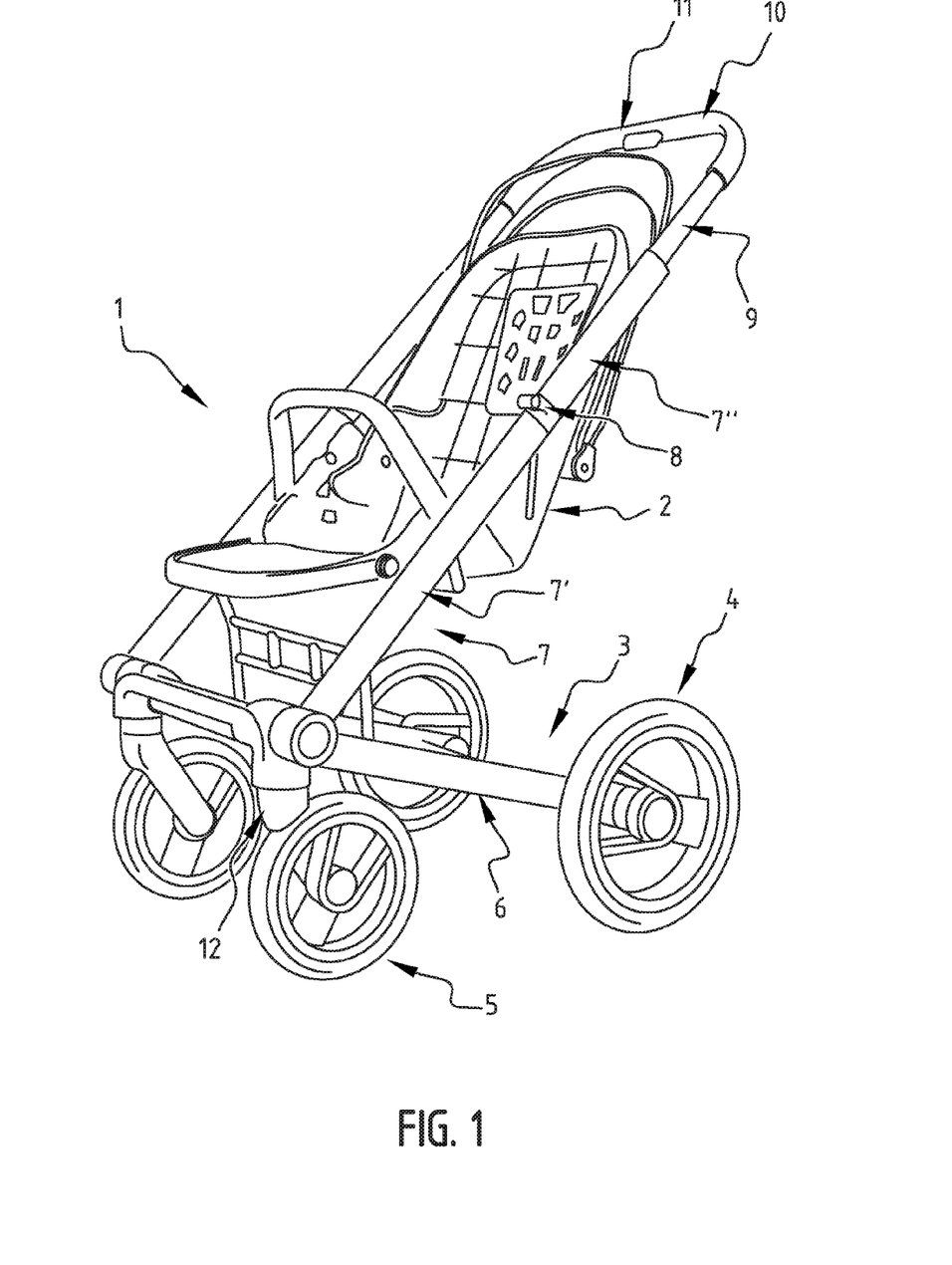
FIG. 1 shows a schematic view of an embodiment of a pushchair according to the present invention.

FIG. 1 shows an embodiment of a pushchair 1 according to the present invention. Pushchair 1 comprises a seat 2 which is mounted on an undercarriage 3. Undercarriage 3 comprises a pair of rear wheels 4 and a pair of front swivel wheels 5. Wheels 4, 5 are rotatably mounted on beams 6. Undercarriage 3 is further provided with obliquely extending beams 7. Beams 7 comprise here a lower part 7' and an upper part 7". These are pivotable relative to each other at hinge 8. A telescopically adjustable push bar 9 which has a handle 10 is further provided in upper part 7". Provided in handle 10 is a control 11 which a user can press for the purpose of adjusting the height of push bar 9.

Figure 2A:
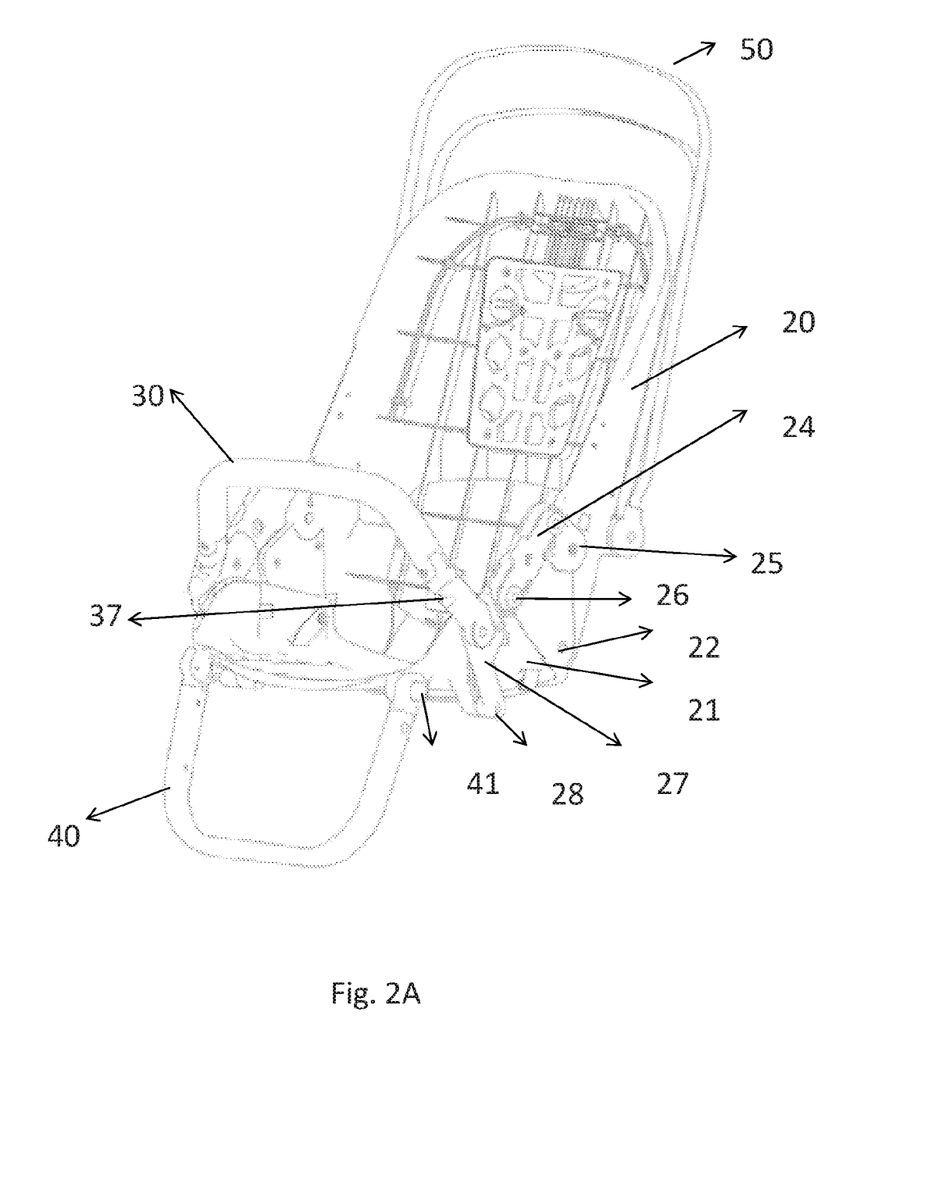
FIGS. 2A and 2B show respectively a front view and a rear view of the seat of FIG. 1.
Figure 2B:
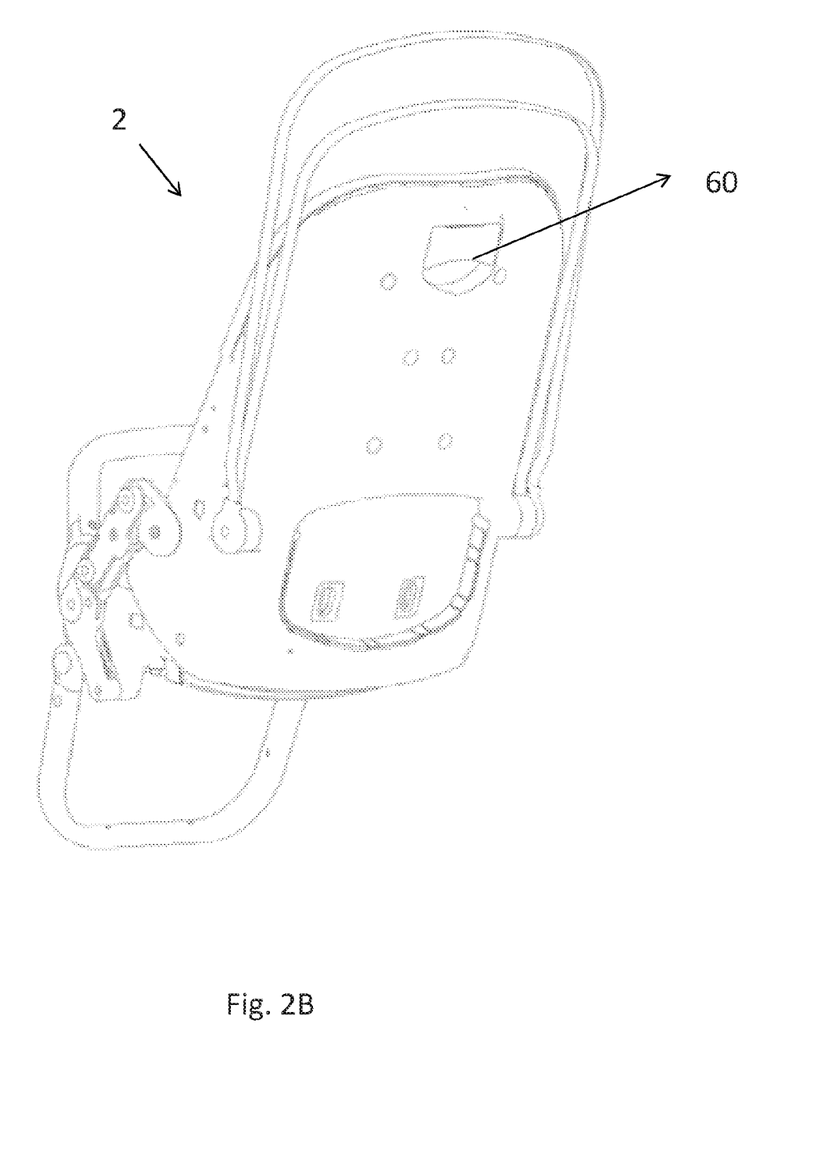

FIGS. 2A and 2B show respectively a front view and a rear view of seat 2 of FIG. 1.

Seat 2 comprises a back part 20 and a seat part 21 which are pivotable relative to each other by means of hinge 22 provided on both sides of seat 2. Back part 20 is connected pivotally to an attaching unit 24 by means of hinge 25. Attaching unit 24 is in turn connected pivotally to a part 27 at hinge 26. Part 27 is in turn connected pivotally to seat part 21 at hinge 28.

Seat 2 has a four-bar linkage. This linkage comprises back part 20, seat part 21, attaching unit 24 and part 27. Seat 2 is further provided with a protective bracket 30 and a footrest 40. Bars 50 can be used to attach a protective cover and are mounted pivotally on back part 20.

FIG. 2A shows the sitting position of seat 2. Protective bracket 30 has a fixed orientation here relative to part 27. Protective bracket 30 can further be removed in known manner by operating an unlocking device 37, see FIG. 2A. The footrest can also be rotated by operating push-button 41.

FIG. 2B shows the rear side of seat 2. Visible in this figure is a handle 60 with which the locking for the relative rotation between back part 20 and seat part 21 can be operated. This will be discussed in more detail with reference to FIGS. 3A-3C.

Figure 3A:
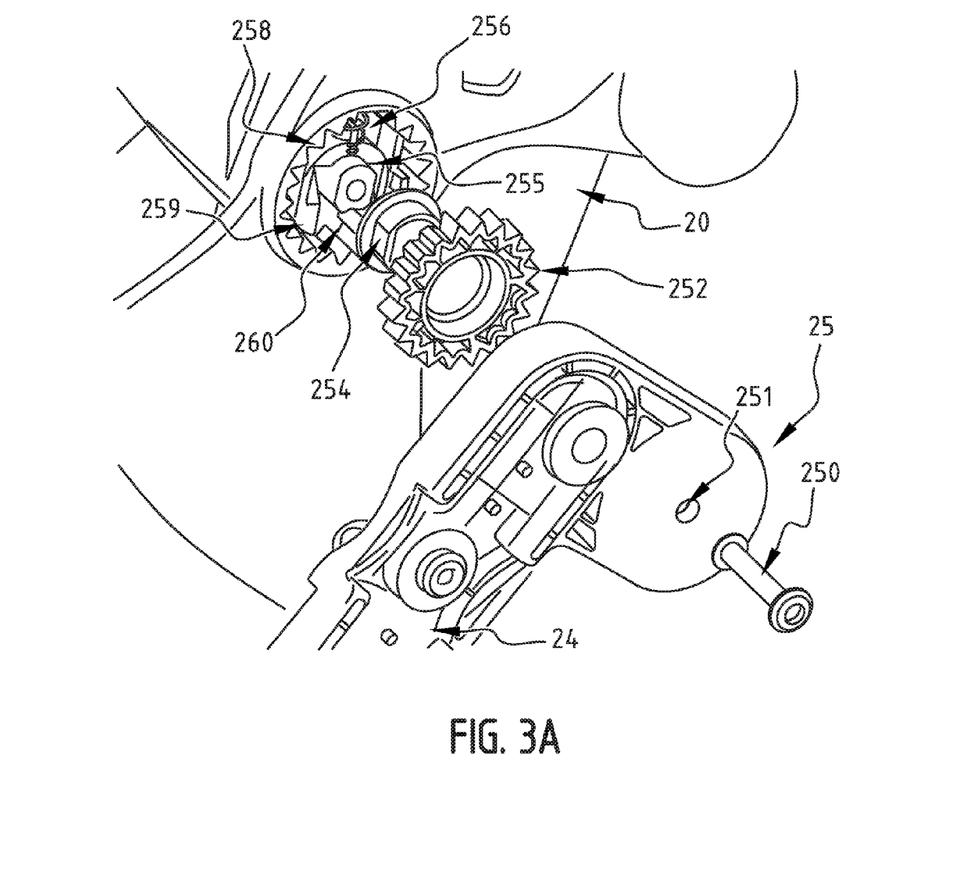
FIGS. 3A-3C show exploded views of the seat of FIG. 1 at the position of the hinge between seat part and attaching unit.
Figure 3B:
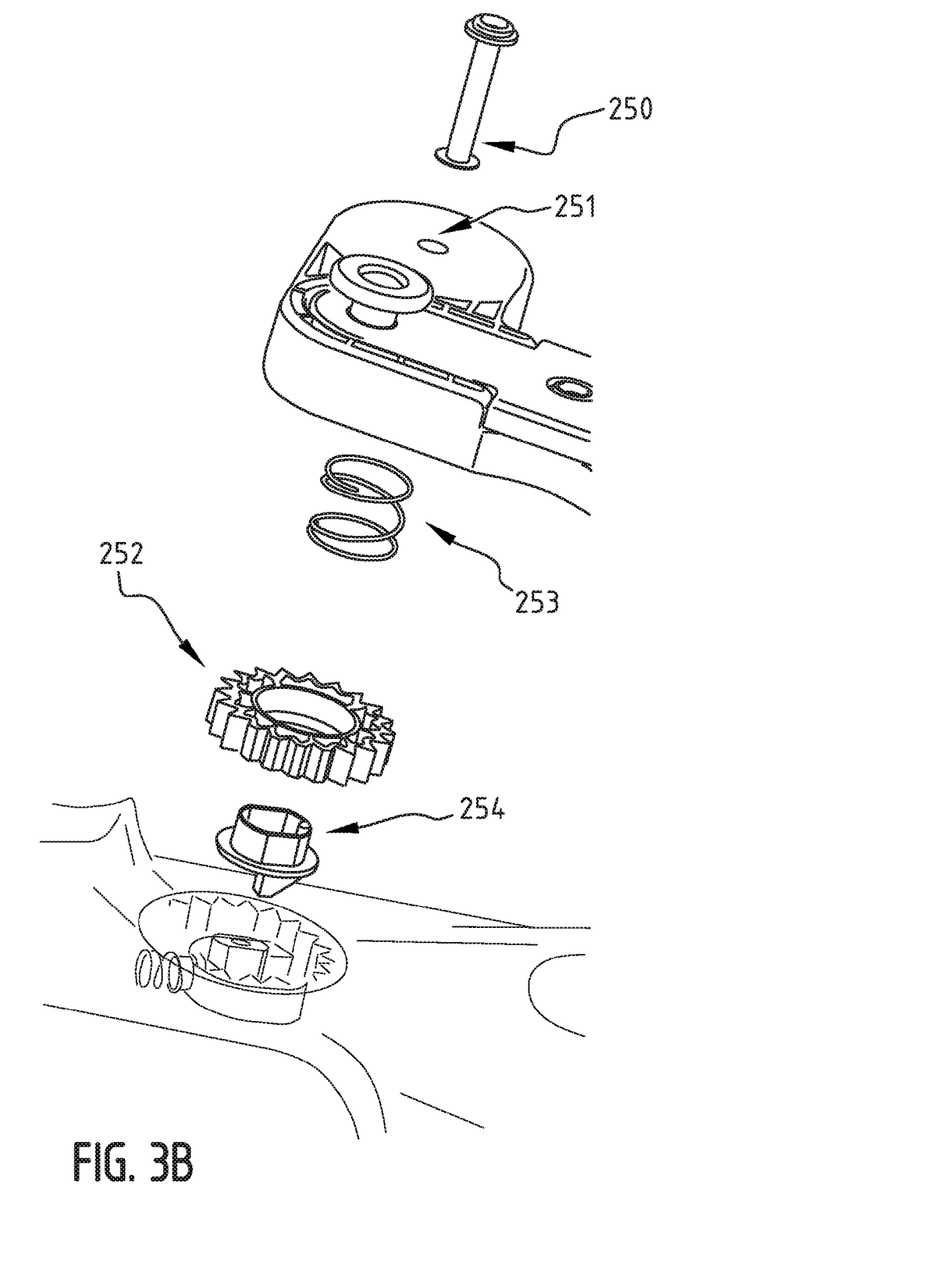

FIG. 3A shows an exploded view at the position of hinge 25. A shaft 250 is shown which protrudes through an opening 251 of attaching unit 24. A toothed wheel 252 is mounted rotatably on shaft 250. A spring 253 presses toothed wheel 252 here in the direction of back part 20, see FIG. 3B. On the other side of toothed wheel 252 there is a pusher part 254 which can co-act with a sliding part 255. Sliding part 255 can here move over support part 257 under spring tension of spring 256. Back part 20 is further provided with a toothing 258 which can co-act with toothed wheel 252. Sliding part 255 is further provided with an edge 259 which can engage on edge 260 of pusher part 254. It is further noted that sliding part 255 can move upward counter to the spring tension by operating handle 60 by means of a cable (not shown).

During normal use of the pushchair back part 20 and seat part 21 are locked relative to each other. This is achieved in that attaching unit 24 is likewise provided with a toothing 261, see FIG. 3C. Toothed wheel 252 hereby engages on both toothing 258 and toothing 261. Back part 20 cannot therefore rotate relative to attaching unit 24. As a result, seat part 21 cannot rotate relative to back part 20 either.

Figure 3C:
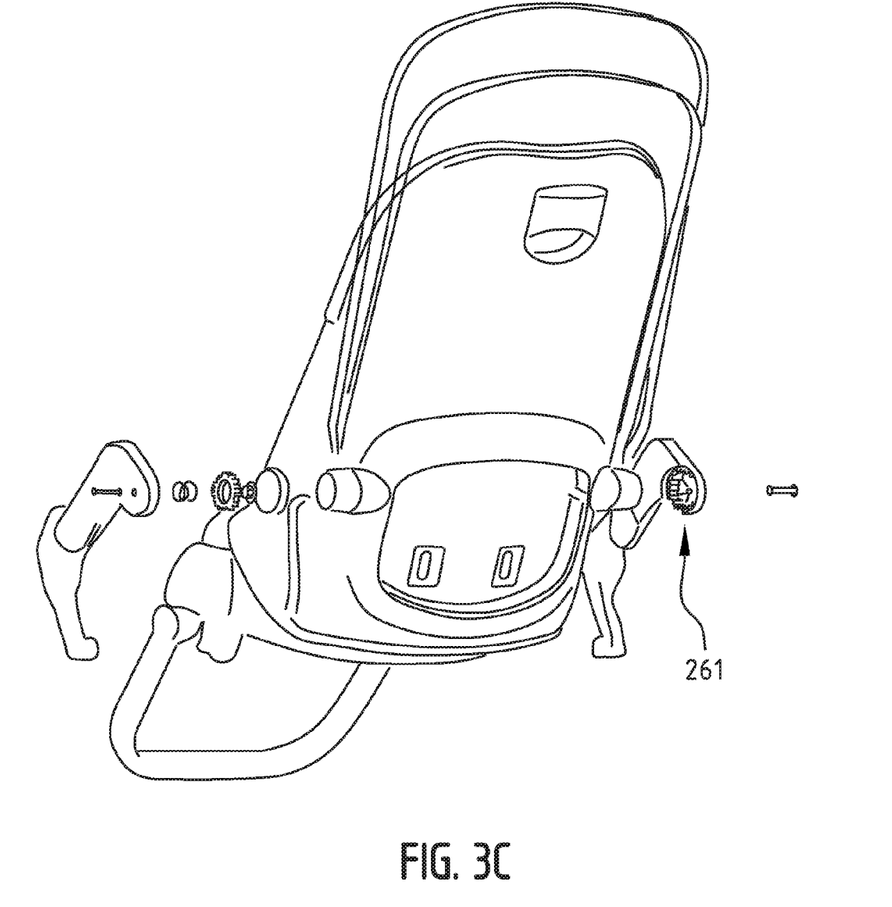

When a user operates handle 60, sliding part 255 will move upward. Edge 259 will hereby push against edge 260, whereby pusher part 254 pushes toothed wheel 252 out of toothing 258. Back part 20 can hereby pivot relative to attaching unit 24 and seat part 21.

Figure 4A:
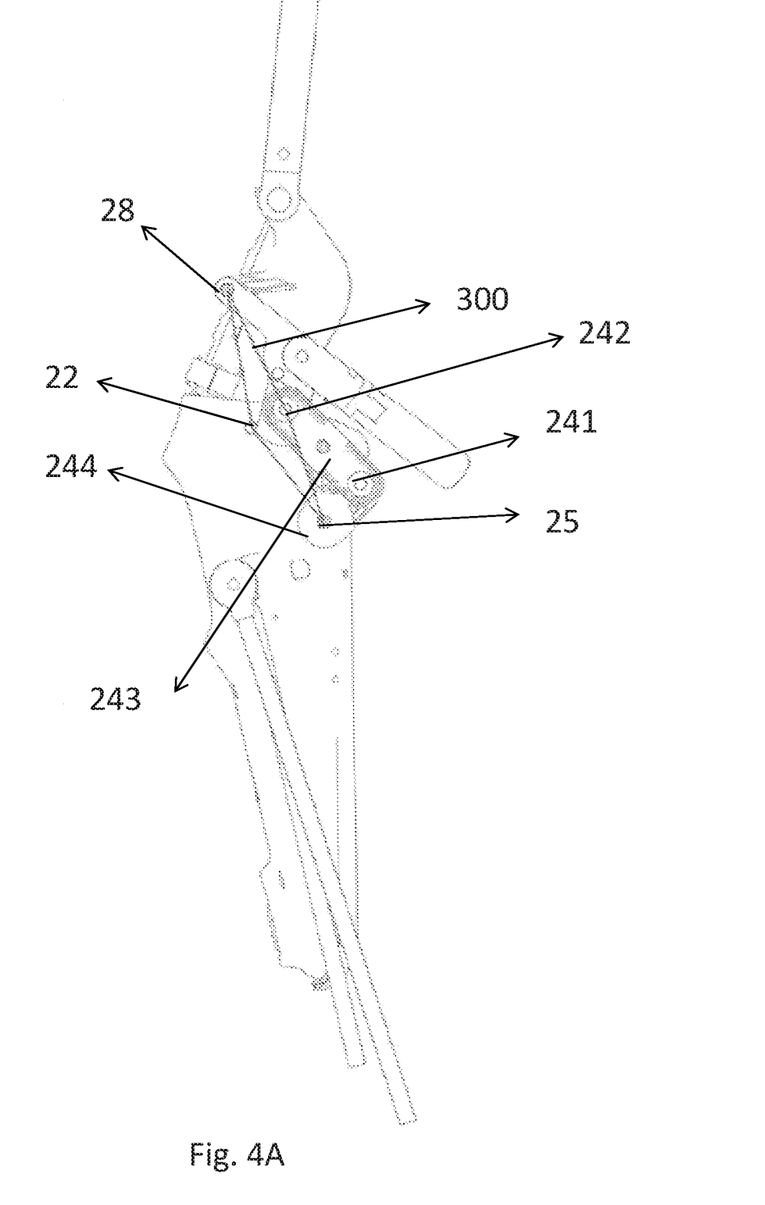
FIGS. 4A-4D show the seat of FIG. 1 in different positions.
Figure 4B:
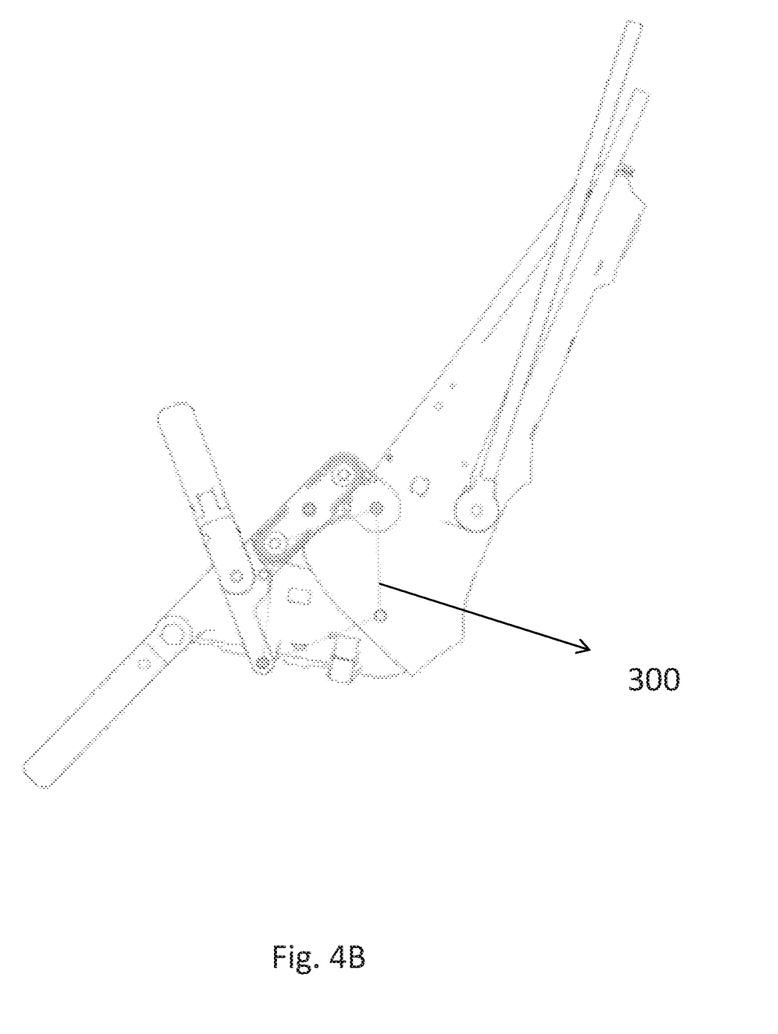

FIGS. 4A and 4B show respectively the recumbent position and the sitting position of seat 2 of FIG. 1. The four-bar linkage 300 is likewise shown schematically here. Attaching unit 24 comprises a second arm 244 which has an L-shape to which a coupling part 243 is attached. This cutting part is provided with protrusions 241 and 242 with which seat 2 is mounted on undercarriage 3. Protrusions 241, 242 engage here in recesses (not shown) in lower parts 7' of undercarriage 3. It is noted here that coupling part 243 can be rotated relative to second arm 244, whereby a further position becomes possible, see FIG. 4D. The position shown in FIG. 4A corresponds to the situation in which coupling part 243 and second arm 244 lie in line. It hereby becomes possible to mount seat 2 in two different ways on undercarriage 3. In one position the child faces forward, in another position the child faces to the rear toward the parent pushing pushchair 1 by means of push bar 9.

It will be apparent from comparison of FIGS. 4A and 4B that pivot points 22, 25, 26 and 28 move relative to each other during pivoting of back part 20 and seat part 21. More particularly, pivot point 22 moves in the direction of pivot point 26 during pivoting from the sitting position in FIG. 4B to the recumbent position in FIG. 4A. This latter pivot point 26 has a fixed orientation relative to undercarriage 3. In other words, pivot point 22 moves forward during pivoting to the recumbent position.

When a child lies down in seat 2 the center of gravity of the child will move to the rear, away from pivot point 22. However, because pivot point 22 itself moves forward, the displacement in the center of gravity of the child can be at least partially compensated. As a result of the four-bar linkage there will thus be less variation in the center of gravity of the combination of seat and child than in the known pushchairs. The distance between rear wheels 4 and front wheels 5 can hereby be reduced. Pushchair 1 as a whole can therefore take a smaller form.

The advantage of the smaller variation in the center of gravity of the combination of seat and child is particularly applicable in the case of a reversible seat as made possible by coupling part 243. This is because the position of the center of gravity of the forward facing seat, in recumbent position, determines the position of the rear wheel, while the position of the center of gravity of the backward facing seat, in recumbent position, determines the position of the front wheel. With such a seat it is thus possible to realize a smaller distance between front wheel and rear wheel without compromising the stability in both forward and backward directions.

Figure 4C:
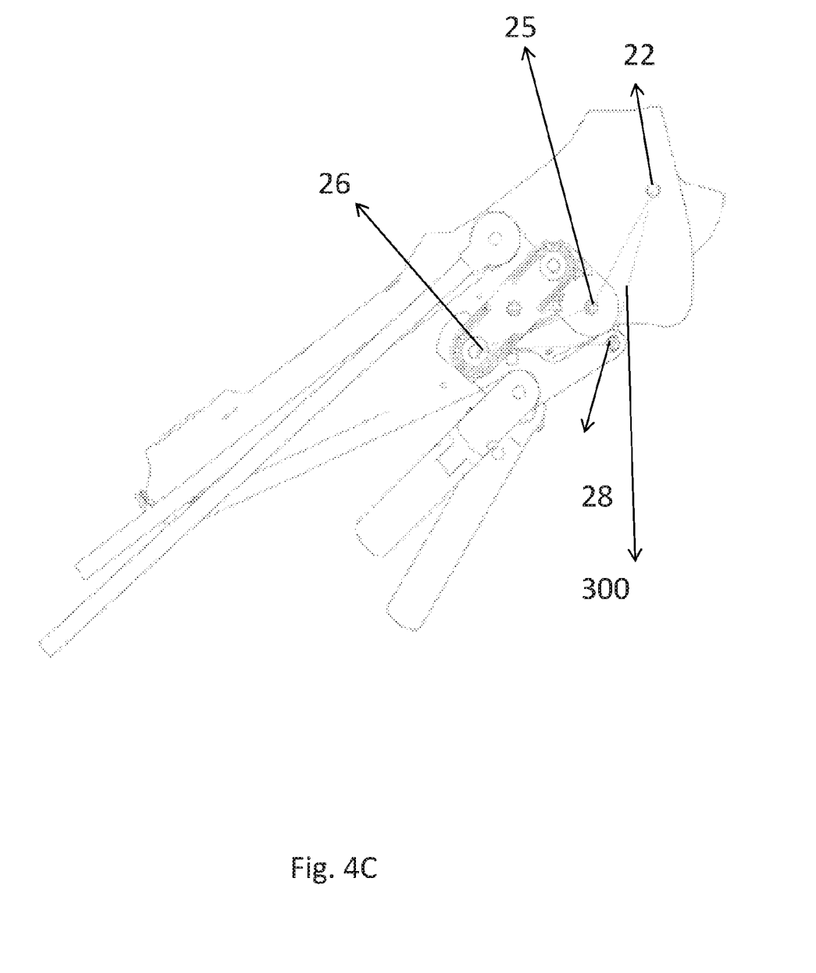
Figure 4D:
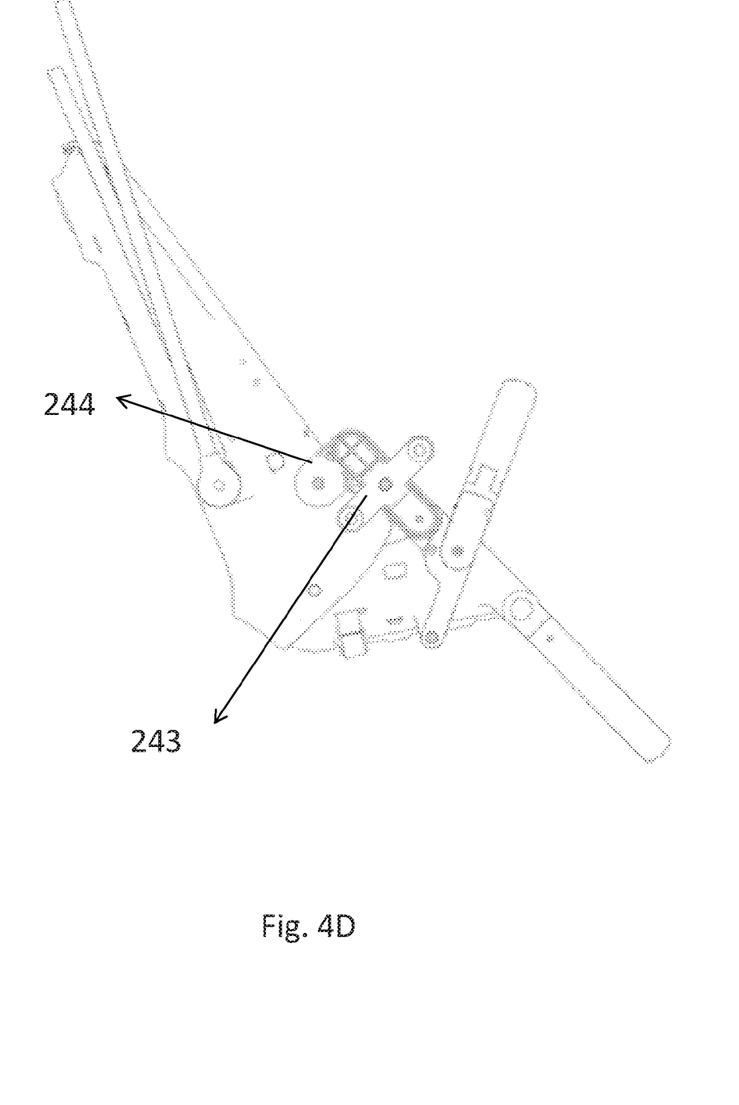

During pivoting from the sitting position in FIG. 4B to the collapsed position in FIG. 4C pivot point 22 moves away from pivot point 26. This latter pivot point has a fixed orientation relative to undercarriage 3. In other words, pivot point 22 moves to the rear during pivoting to the collapsed position. During collapsing of the seat, back part 20 and seat part 21 come to lie substantially parallel to second arm 244 of attaching unit 24, and more particularly to the long part of L-shaped second arm 244. A particularly compact form of the collapsed pushchair can hereby be obtained.

As noted above, in the sitting position and recumbent position protective bracket 30 has a fixed orientation relative to part 27. This has the advantage that during pivoting between recumbent position and sitting position protective bracket 30 automatically co-displaces to a position that is as comfortable as possible for the child. In FIG. 4A protective bracket 30 is thus positioned above the waist of the child instead of above the lower legs. Such a mechanism does however have drawbacks when seat 2 is folded down to the collapsed position shown in FIG. 4C.

Figure 5A:
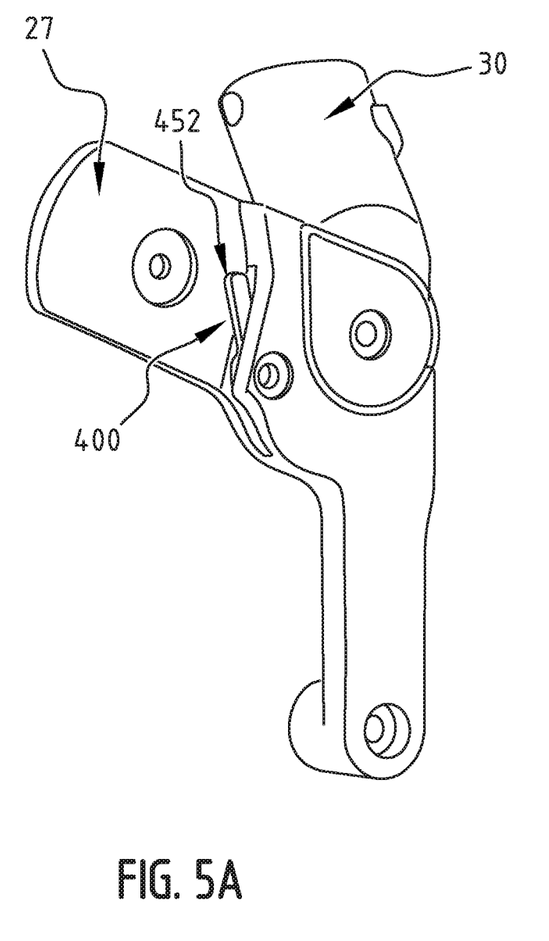
FIGS. 5A-5C show the locking mechanism of the protective bracket of the seat of FIG. 1.
Figure 5B:
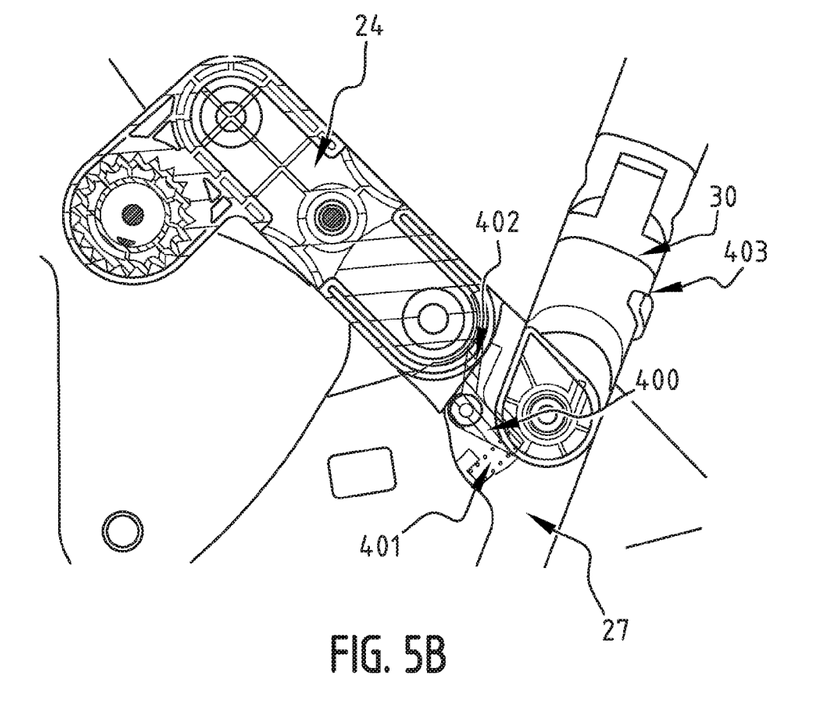
Figure 5C:
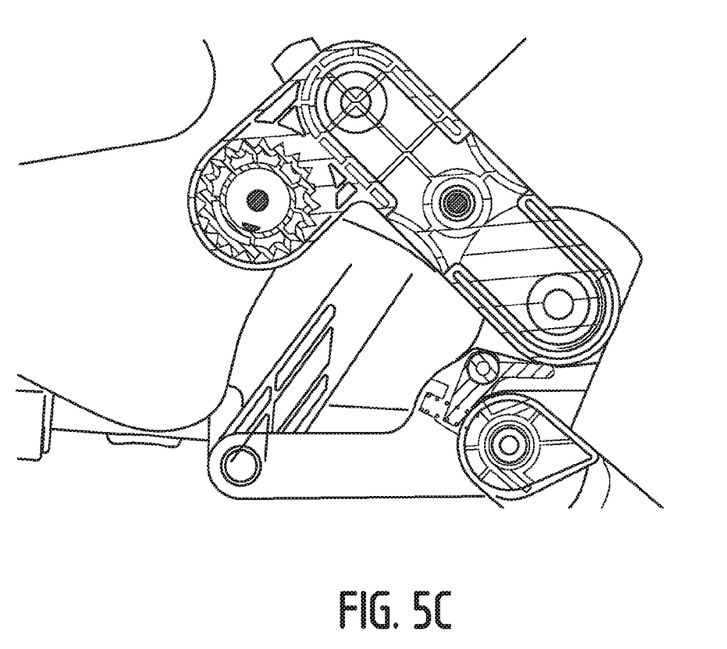

Pushchair 1 is collapsible by pivoting bars 7' and 7". Bar 7" is tilted forward here together with push bar 9. The entity of bars 7', 7" and 9 will then be tilted downward by means of hinges 12, see FIG. 1. Without further measures however, the problem arises of protective bracket 30 of collapsed seat 2 becoming jammed during collapsing of undercarriage 3. FIGS. 5A-5C show a locking mechanism which solves this problem.

A hook 400 is present in each of the parts 27 on which protective bracket 30 is pivotally mounted. Hook 400 is pressed upward by a compression spring 401 and then blocks protective bracket 30 against rotation. At the other end hook 400 has an arm 402 with which it lies in a groove of attaching unit 24. When seat 2 is collapsed, part 27 and attaching unit 24 rotate relative to each other, whereby arm 402 is pressed at a given moment out of the groove. Hook 400 then rotates a little, whereby the blocking of protective bracket 30 is ended. This latter is then free to rotate, and will therefore not become jammed during the collapsing of undercarriage 3 as shown in FIG. 5C.

Protective bracket 30 can be released both on the left and right. Single-sided release makes seat 2 more readily accessible, the protective bracket can be tilted away for this purpose. Release of protective bracket 30 on both sides enables complete removal thereof. Release takes place by operating button 403, see FIG. 5B. The operation of such a mechanism is known.

The invention is elucidated above on the basis of embodiments. It will be apparent to the skilled person that the scope of protection is not limited hereto but is defined by the following claims.

The invention claimed is:

1. Seat configured for placing on an undercarriage of a pushchair or buggy, the seat comprising:
  a back part;
  a seat part coupled pivotally to the back part, wherein the seat part and the back part together form a support surface suitable for supporting a child in a recumbent position and sitting position;
  an attaching unit coupled pivotally to the back part, which attaching unit is connectable to the undercarriage;
  wherein the back part and the seat part can pivot relative to each other between the sitting position and recumbent position;

wherein the seat further comprises:
a first arm which is connected pivotally to the attaching unit and pivotally to the seat part;
wherein the seat comprises a four-bar linkage, wherein one arm is formed by the attaching unit, one arm by the back part, one arm by the seat part and one arm by the first arm;
wherein the back part and the seat part are connected pivotally at a first pivot point, this point moving toward the attaching unit during pivoting from the sitting position to the recumbent position.

2. Seat as claimed in claim 1, wherein the movement of the first pivot point during pivoting from the sitting position to the recumbent position substantially compensates a difference in position of a center of gravity of the child between a sitting position and a recumbent position, such that the center of gravity of a combination of seat and child does not change, or hardly so, during said pivoting.

3. Seat as claimed in claim 1, wherein the relative position and form of the four bars of the four-bar linkage are configured such that, when the seat is collapsed, the back part and the seat part come to lie substantially parallel to the attaching unit.

4. Seat as claimed in claim 1, wherein the relative position and form of the four bars of the four-bar linkage are configured such that, when the seat is collapsed, the pivot point between the back part and the seat part displaces substantially to the rear relative to the attaching unit.

5. Seat as claimed in claim 1, wherein the attaching unit comprises:
a second arm which is coupled pivotally to the back part and to the first arm;
a coupling part with coupling means for coupling of the coupling part to the undercarriage;
locking means for coupling and fixing the coupling part and the second arm in relative position, and for releasing the relative position;
wherein the coupling part is connectable to the second arm in at least two different angular positions.

6. Seat as claimed in claim 5, wherein the coupling part is connectable to the second arm at two different angular positions at right angles to each other.

7. Seat as claimed in claim 1, wherein the movement of the first pivot point in a forward direction lies between 0 and 40 percent of a length of the seat part, and more particularly between 10 and 30 percent of the length of the seat part.

8. Seat as claimed in claim 1, wherein the attaching unit and the first arm are placed on the sides of the back part and the seat part forming the support surface.

9. Seat as claimed in claim 1, wherein the seat comprises an attaching unit and a first arm as defined in claim 1 on either side of the seat.

10. Seat as claimed in claim 1, comprising locking means for locking the pivoting of the back part and the seat part.

11. Seat as claimed in claim 10, wherein the locking means comprise:
a first engaging structure placed on or in the back part;
a second engaging structure placed on or in the attaching unit;
which first and second engaging structures are movable between a locking position, in
which the engaging structures engage each other and relative rotation of the back part and the attaching unit is locked, and a release position in which the engaging structures do not engage each other, or hardly so, whereby the back part and the attaching unit are pivotable relative to each other.

12. Seat as claimed in claim 1, further comprising a protective bracket coupled to the first arm.

13. Seat as claimed in claim 12, wherein the protective bracket has a fixed orientation relative to the first arm in the recumbent position and sitting position.

14. Seat as claimed in claim 12, wherein the seat is collapsible by pivoting the seat part and the back part toward each other.

15. Seat as claimed in claim 14, wherein the protective bracket is coupled pivotally to the first arm, the seat further comprising second locking means for mutual locking of the protective bracket and the first arm.

16. Seat as claimed in claim 15, wherein the second locking means are configured to release the protective bracket when there is sufficient relative rotation of the seat part and the back part such that it can pivot relative to the first arm.

17. Seat as claimed in claim 1, wherein the seat part and the back part are manufactured at least partially, and preferably for more than 75 percent by volume, from rigid materials.

18. Seat as claimed in claim 1, wherein the attaching unit is releasably connectable to the undercarriage.

19. Pushchair or buggy comprising an undercarriage and a seat coupled thereto, wherein the seat is configured as claimed in claim 1.

20. Pushchair or buggy as claimed in claim 19, wherein the undercarriage is provided with a front wheel and a rear wheel, wherein the seat is coupled to the undercarriage such that, when a child is present in the seat, the center of gravity of the combination of the seat and the child lies between the rear wheel and front wheel in both the sitting position and the recumbent position.

21. Seat as claimed in claim 1, wherein the seat part is coupled pivotally to the back part by a hinge positioned at both sides of the seat.

* * * * *